United States Patent
Johnson et al.

(10) Patent No.: US 8,939,672 B2
(45) Date of Patent: Jan. 27, 2015

(54) RETENTION, RELEASE, AND SEPARATION DEVICE, SYSTEM, AND METHOD

(75) Inventors: Timothy Bruce Johnson, Sahuarita, AZ (US); Ross Michael LaCombe, Sahuarita, AZ (US); David Scott Sharp, Tucson, AZ (US); Peter Joseph Golden, Seattle, WA (US); Keith Krasnowski, Lynnwood, WA (US)

(73) Assignees: Raytheon Company, Waltham, MA (US); Systima Technologies, Inc., Bothell, WA (US)

( * ) Notice: Subject to any disclaimer, the term of this patent is extended or adjusted under 35 U.S.C. 154(b) by 228 days.

(21) Appl. No.: 13/481,503

(22) Filed: May 25, 2012

(65) Prior Publication Data

US 2013/0315686 A1    Nov. 28, 2013

(51) Int. Cl.
  *B60P 7/08*    (2006.01)
(52) U.S. Cl.
  USPC .......................................................... 403/34

(58) Field of Classification Search
  USPC ......... 403/34; 294/82.26; 410/77; 244/137.4; 89/1.51, 1.54, 1.57; 102/377, 378
  See application file for complete search history.

(56) References Cited

U.S. PATENT DOCUMENTS

| 7,083,148 B2 * | 8/2006 | Bajuyo et al. | |
| 8,186,900 B2 * | 5/2012 | Riley et al. | 403/31 |

* cited by examiner

*Primary Examiner* — Stephen Gordon
(74) *Attorney, Agent, or Firm* — Thorpe North & Western LLP

(57) ABSTRACT

A retention, release, and separation device is disclosed. The device includes a clip to secure a component and a capturing sleeve to secure the clip and prevent release of the component. The capturing sleeve can alternately facilitate displacement of the clip to release the component. The device also includes a separation piston that provides a separation force to the component to actively separate the component from the device upon release of the component. Additionally, the device includes a fluid source to provide a fluid pressure sufficient to displace the capturing sleeve and the separation piston, and to generate the separation force.

12 Claims, 3 Drawing Sheets

RETENTION, RELEASE, AND SEPARATION DEVICE, SYSTEM, AND METHOD

BACKGROUND

It is desirable to have a device and method which can both retain an object but also release and cause the object to separate. Such a device could have many applications such as retaining a fuel tank to an aircraft, a warhead or another stage to a missile or equipment retained on a moving vehicle and separated upon an event. This device will be described relative to a payload often carried on an upper stage of a missile and deployed by an ejector system. Conventional ejector systems can induce high shock loads on the payload upon deployment or release, which can adversely affect various functions, including payload electronics. High shock loads can therefore have potentially serious consequences on missile and/or payload operation. Additionally, conventional ejection system can contain multiple subsystems to perform the release and separation functions, which can be bulky and potentially increase weight adversely affecting missile performance. Having a device that integrates all three functions benefits from a small form factor and low weight. Also, the methods described herein perform these functions with minimal shock and a substantial preload relative to the device size. Ejector system shock is typical due to the demanding fast response operation times expected. The dual action release and separation function operates rapidly to provide consistent and repeatable operation times while minimizing induced shock.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
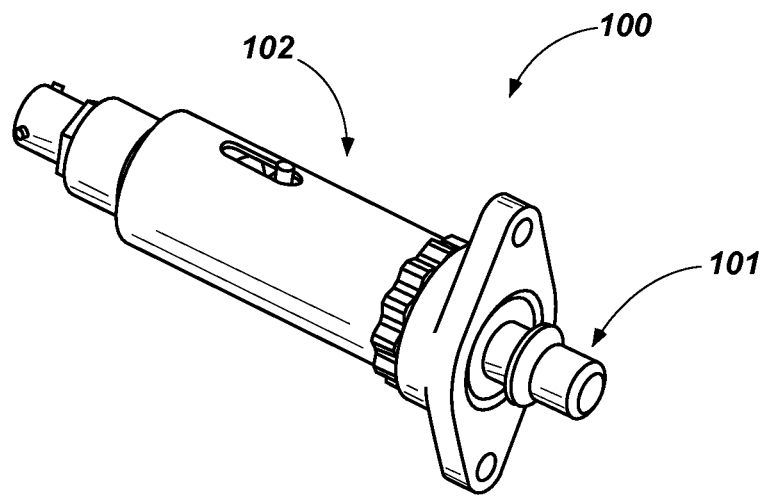
FIG. 1A is a perspective view of a retention, release, and separation system in accordance with an exemplary embodiment.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although conventional ejector systems are adequate at maintaining a preloaded joint in the coupling of a payload (e.g., a warhead) and a missile, rocket, etc., high shock loads produced by payload deployment can be of concern. Thus, it is desirable to not only retain the payload on the missile with suitable preload, but to also reduce or minimize shock loads experienced when releasing and separating the payload from the missile.

Accordingly, a retention, release, and separation device is disclosed that enables sufficient preload in a payload and missile coupling, and also reduces shock loads from payload deployment over conventional or existing ejector systems.

In one exemplary embodiment, the device can include a clip to releasably secure a component and a capturing sleeve to secure the clip and prevent release of the component. The capturing sleeve can alternately facilitate displacement of the clip to release the component. The device can also include a separation piston that provides a separation force to the component to actively separate the component from the device upon release of the component. Additionally, the device can include a fluid source to provide a fluid pressure sufficient to displace the capturing sleeve and the separation piston, and to generate the separation force.

A retention, release, and separation system is also disclosed. The system can include a first component and a second component configured to couple with and actively separate from the first component. The second component can include a clip to secure the first component and a capturing sleeve to secure the clip and prevent release of the first component. The capturing sleeve can alternately facilitate displacement of the clip to release the first component. The second component can also include a separation piston that provides a separation force to the first component to actively separate the first component from the second component, for instance, upon or during release of the first component. Additionally, the second component can include a fluid source to provide a fluid pressure sufficient to displace the capturing sleeve and the separation piston, and to generate the separation force.

In addition, a method for facilitating retention, release and separation of a first component from a second component is disclosed. The method comprises facilitating retention of a first component to a second component, wherein a clip supported in the second component is configured to secure the first component, the clip being secured by a capturing sleeve that is also supported in the second component, and that selectively prevents release of the first component. The method further comprises facilitating release of the first component, wherein a fluid source provides a fluid pressure sufficient to displace the capturing sleeve, which facilitates displacement of the clip to release the first component. In addition, the method comprises facilitating separation of the first component from the second component, wherein the fluid source provides a fluid pressure sufficient to displace a separation piston and generate a separation force provided by the separation piston to the first component to actively separate the first component from the second component.

Figure 1B:
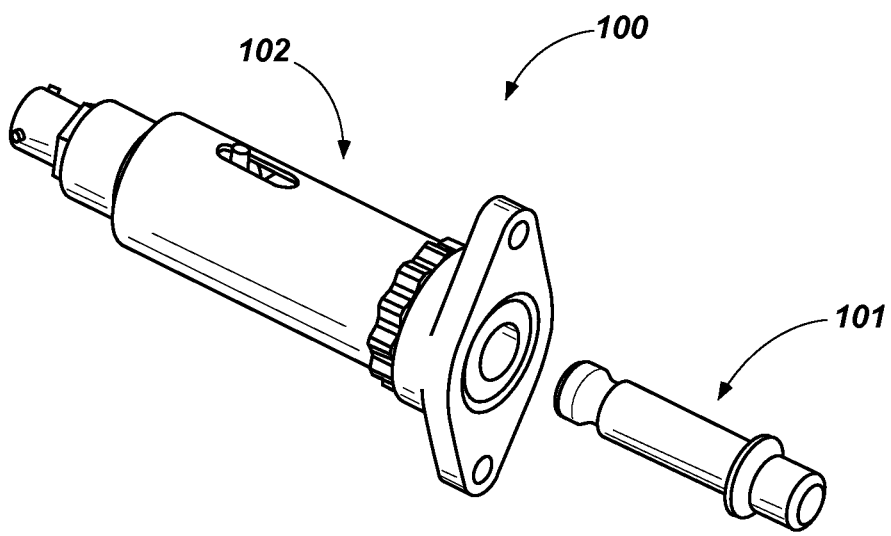
FIG. 1B is a view of the retention, release, and separation system of FIG. 1A in a separated configuration.

One exemplary embodiment of a retention, release, and separation system 100 is illustrated in FIGS. 1A and 1B. The system 100 can comprise a first component 101 and a second component or device 102 configured to couple with and actively release and separate from the first component 101. The system 100 can be a retention, release, and separation system, as described herein.

Figure 2:
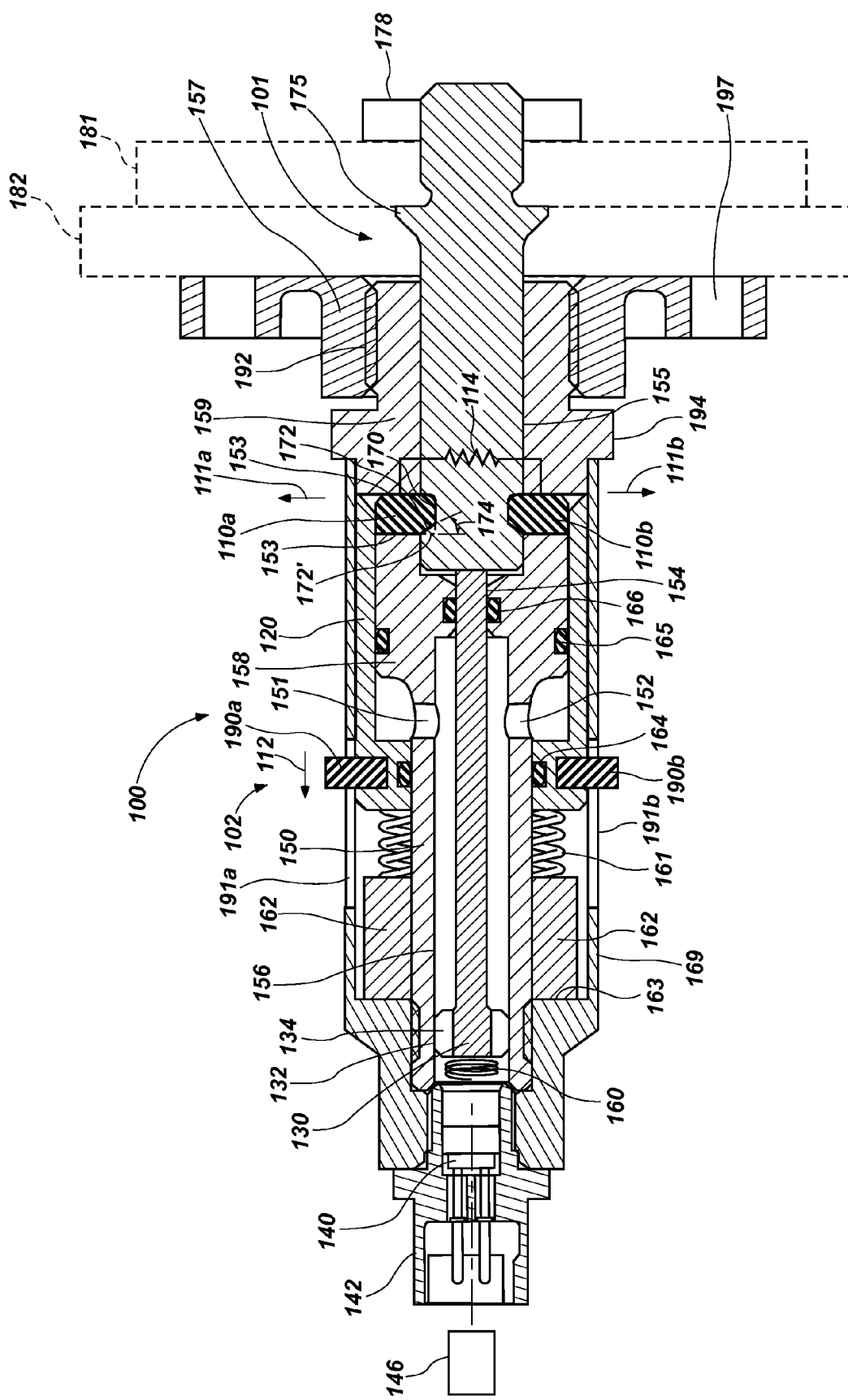
FIG. 2 is a cross-sectional view of the retention, release, and separation system of FIG. 1A.

For example, with reference to the section view illustrated in FIG. 2, the retention, release, and separation device 102 can include clips 110a, 110b to secure a component, such as the first component 101. In this embodiment, the clips 110a, 110b are configured to move in opposite directions 111a, 111b to release the first component 101. In one aspect, the clips 110a, 110b and/or the first component 101 can be configured, such that a tensile load in the first component 101, such as a preload, can cause the first component 101 to act on the clips 110a, 110b and displace the clips to the extent that the first component 101 is released by the clips (assuming the device status is such that the clips are permitted to move or displace during such an operational scenario). In another aspect, the clips 110a, 110b can be biased (schematically represented by a spring 114) in a position to release the first component 101. To maintain a secure coupled condition between the first and second components 101 and 102, and to prevent untimely or unwanted movement of the clips 110a, 110b and subsequent release of the first component 101, the device 102 can include a capturing sleeve 120 operable to secure the clips 110a, 110b. The capturing sleeve 120 can be configured and positioned in one position to prevent movement of the clips 110a, 110b, and can be selectively positioned in another position to facilitate movement of the clips 110a, 110b to release the first component 101.

More specifically, the capturing sleeve 120 can alternately facilitate displacement of the clips 110a, 110b to release the first component 101. For example, the capturing sleeve 120 can be a dynamic sleeve that can be caused to move or displace such that the capturing sleeve 120 no longer provides a physical stop or barrier to movement of the clips 110a, 110b, at least to the extent that the clips 110a, 110b can release the first component 101. Thus, the capturing sleeve 120 can facilitate movement or displacement of the clips 110a, 110b sufficient to allow the clips 110a, 110b to release the first component 101.

As used herein, the clip 110 has "released" the first component 101 when the first component 101 is capable of complete separation from the device 102.

In some embodiments, the clips 110a and 110b can be configured to move or displace to a certain extent relative to the first component 101 and/or the capturing sleeve 120 without "releasing" the first component 101. Moreover, it should be noted that in some embodiments a single clip can be used to secure the first component 101.

The first component 101 can comprise a surface configuration that defines, at least in part, a channel 170 to interface with a surface configuration formed in the clips 110a, 110b. In one aspect, the channel 170 can comprise a ramped or angled surface 172, having an angle 174, to interface with the clips 110a, 110b and facilitate release of the first component 101 from the clips 110a, 110b. The ramped surface 172 can force the clips 110a, 110b into a released position under a load in the first component 101, such as a preload. On the other hand, the channel 170 can include a surface 172' that is substantially parallel to a direction of travel of the clips 110a, 110b as the clips 110a, 110b displaces to release the first component 101.

In one aspect, the capturing sleeve 120 can be biased, such as with a spring 161, in a direction to secure the clips 110a, 110b and to prevent unwanted release of the first component 101. In another aspect, a spring and/or a damper 162 can be incorporated into the device to provide resistance to displacement of the capturing sleeve 120 once the capturing sleeve 120 has displaced a sufficient distance to allow the clips 110a, 110b to initiate displacement leading to release of the first component 101. In this way, the capturing sleeve 120 can be configured to allow the clips 110a, 110b to release the first component 101 and shock loads resulting from an impact of the capturing sleeve 120 on a backing surface 163 can be reduced. The spring and/or damper 162 can comprise a typical metal spring, an elastomeric material, an air spring and/or a piston damper or any other suitable type of spring and/or damper to reduce velocity of the capturing sleeve 120 while reducing shock loads between the capturing sleeve and the backing surface 163.

The device 102 can further include a separation piston 130 that is configured to provide a separation force to the first component 101 to actively separate the first component 101 from the device 102 upon release of the first component 101. In one aspect, the separation piston 130 can be biased, such as by a spring 160, to maintain contact between an end of the separation piston 130 and the first component 101 when the first component 101 is secured by the capturing sleeve 120. Maintaining contact between the separation piston 130 and the first component 101 can reduce shock loads resulting from an application of a separation force from the separation piston 130 to the first component 101, such as would be the case in the event of an impact of the separation piston 130 with the first component 101 if the two were not maintained in contact. In one aspect, the capturing sleeve 120 and the separation piston 130 can be configured to displace in opposing directions, as in the FIG. 2 embodiment, although other configurations are possible.

The capturing sleeve 120 and/or the separation piston 130 can be caused to displace by a fluid pressure provided by a fluid source 140. In one aspect, the fluid source 140 can be fluidly connected to the separation piston 130 and the capturing sleeve 120, or in other words, can provide fluid pressure to both the capturing sleeve 120 and the separation piston 130, although separate fluid sources can be provided for each one. In a further aspect, the fluid pressure provided by the fluid source 140 can act on both the capturing sleeve 120 and the separation piston 130 at the same time. In other words, the capturing sleeve 120 and the separation piston 130 can at least begin to receive fluid pressure from the fluid source 140 prior to displacing. Ultimately, the fluid pressure introduced by the fluid source 140 can be sufficient to displace the capturing sleeve 120 and the separation piston 130. The fluid source 140 can also be configured to provide fluid pressure sufficient to generate the separation force delivered by the separation piston 130 to the first component 101.

In one aspect, the fluid source 140 can comprise a pyrotechnic charge that can generate a gas upon firing. An electrical impulse can initiate activation of the fluid source 140 to provide fluid pressure. The pyrotechnic charge can be housed in a shell 142 and the shell 142 can be configured to support an electrical coupling that delivers the electrical impulse to the pyrotechnic charge. It should be recognized that the shell 142 can be at any suitable position or angle relative to the other components of the system as long as the fluid source 140 can provide fluid pressure sufficient to cause displacement of the capturing sleeve 120 and the separation piston as well as generate a sufficient separation force a discussed herein. In another aspect, the fluid source can comprise a reservoir 146 containing pressurized fluid that is fluidly connected to the separation piston 130 and/or the capturing sleeve 120. Release and/or control of the fluid can be by known means.

As further illustrated in FIG. 2, the device 102 can include a housing 150, which can have a base 159 and an extension 158. The housing 150 can include a single component, as illustrated, or multiple components. Multiple housing 150 components can be beneficial in facilitating construction of the device 102. For example, in one aspect, the separation piston 130 can be slidably disposed in an interior of the housing 150. A separate base and extension can facilitate assembly of the separation piston 130, or other components, such as spring 160, in the interior of the housing 150. The fluid source 140 can be fluidly coupled to the housing 150 (e.g., the interior of the housing) to provide fluid pressure to displace the capturing sleeve 120 and the separation piston 130. In one aspect, the capturing sleeve 120 can be slidably disposed and supported about an exterior of the housing 150 to alternately secure and release the clips 110*a*, 110*b*. To provide fluid pressure to displace the capturing sleeve 120, the housing 150 can include a port (represented by reference numbers 151, 152) fluidly coupling the interior and the exterior of the housing 150. The capturing sleeve 120 can extend over the ports 151, 152 to receive fluid through the ports 151, 152. In one aspect, the port 151, 152 can be disposed radially (from axis 104) in the housing 150.

Upon initiation of the fluid source 140, pressurized fluid can travel from the fluid source 140 through the housing 150 to the separation piston 130. The separation piston 130 can be configured to receive the pressurized fluid affecting a force on the first object 101 and still allow fluid to flow to ports 151, 152. In one aspect, the pressurized fluid can pass around an outer surface of the separation piston 130 through openings 134 in a guide used to align the separation piston 130 in the housing 150. In one aspect, the spring 160 can contact a back end of the separation piston 130 to provide force to the separation piston 130. The pressurized fluid can also travel through the interior of the housing 150 to the ports 151, 152, where the pressurized fluid can flow from the interior of the housing 150 to the exterior of the housing 150. Once the pressurized fluid has traveled through the ports 151, 152, the pressurized fluid can cause movement of the capturing sleeve 120 along the exterior of the housing 150.

Various seals can be used to maintain pressure and provide pressure boundaries between adjacent or mating components. For example, a seal, such as o-ring 166, can maintain a pressure and provide a pressure boundary between the housing 150 and the separation piston 130. Additionally, a seal, such as o-rings 164, 165, can maintain a pressure boundary between the housing 150 and the capturing sleeve 120. Furthermore, a cover 169 can be disposed over the capturing sleeve 120, and the spring 161. The cover 169 can protect the device 102 by minimizing the chance for debris or other obstacles to enter that can hinder displacement of the capturing sleeve 120.

In one aspect, the clips 110*a*, 110*b* can be slidably supported by the housing 150 to alternately secure and release the first component 101. For example, the housing 150 can include a portion 153 formed therein to support and guide movement of the clips 110*a*, 110*b* and allow the clips 110*a*, 110*b* to slide along the housing 150. The portion 153 of the housing 150 can also be configured to accommodate bearing stress from force exerted on the housing 150 from the clips 110*a*, 110*b* while secured to the first component 101, such as a force due to preload and/or an operating load.

In another aspect, the housing 150 can comprise guides 154, 156 to guide movement of the separation piston 130 as the separation piston 130 moves to apply the separation force to the first component 101. Guide 154 can be configured to guide a leading end of the separation piston 130, such as upon initial displacement of the separation piston 130. Guide 156 can be configured to guide a trailing end of the separation piston 130, such as upon initial displacement of the separation piston 130. The separation piston 130 can include a flange 132 to interface with the guide portion 156 and to provide an interference with the housing 150 to capture the separation piston 130 within the housing 150 upon completion of the separation stroke applying the separation force to the first component 101. The flange 132 can include a gap or opening 134 to allow fluid to more readily flow around the separation piston 130 within the housing 150 to more efficiently pressurize the capturing sleeve 120 and/or to reduce contact friction between the flange 132 and the guide portion 156.

The housing 150 can also comprise a guide 155 to guide movement of the first component 101 during separation from the device 102. The guide 155 and the first component 101 can be configured to prevent binding of the first component 101 within the housing 150 as the first component is separated from the device 102. In other words, the guide 155 and the first component 101 can be configured to guide movement of the first component 101 substantially parallel to axis 104 as the first component 101 separates from the device 102. Off-axis movement, such as twisting or rotation, can cause the channel 170 or other features of the first component 101 to catch or bind with features or components of the device 102, such as the clips 110*a*, 110*b* or housing portion 153 that guides and supports the clips 110*a*, 110*b*. The guide 155 can therefore minimize negative effects of such off-axis movement.

The system 100 can also include a first object 181 coupled to the first component 101. For example, the first component 101 can comprise a flange 175 and a threaded fastener 178 to secure the first object 181 and provide coupling with the first object 181. The first object 181 can comprise any suitable object. In one exemplary application, the first object 181 can comprise a payload. The system 100 can further include a second object 182 coupled to the device 102. For example, the housing 150 can include a flange 157 for coupling the device 102 to the second object 182. The second object 182 can comprise any suitable object. In one exemplary embodiment, the second object can comprise a missile.

In one aspect, the first component 101, the device 102, the first object 181, and the second object 182 can form a preloaded joint. To form such a preloaded joint, the second object 182 can be coupled to the device 102. The first component 101 can be retained by the device 102 in the manner described herein. The first object 181 can be coupled to the first component 101, such as with threaded fastener 178. The second object 182 and the device 102 can be coupled with the mounting flange 157 using hole 197. The first object 181 and the second object 182 can be joined by withdrawing pins 190*a*, 190*b* in slots 191*a*, 191*b*, respectively, in direction 112 against spring 161 to pull the sleeve 120 to release clips 110*a*, 110*b*. The first component 101, installed on the first object 181, can be inserted into the device 102, and the manual release pins 190 can be released and biased by the spring 161 to re-engage the clips 110*a*, 110*b*. After the clips 110*a*, 110*b* are engaged a preload can be established by rotating torque feature 194 of the device 102 relative to flange 157 to act on the threaded interface 192 to establish the desired preload in the final configuration.

Figure 3A:
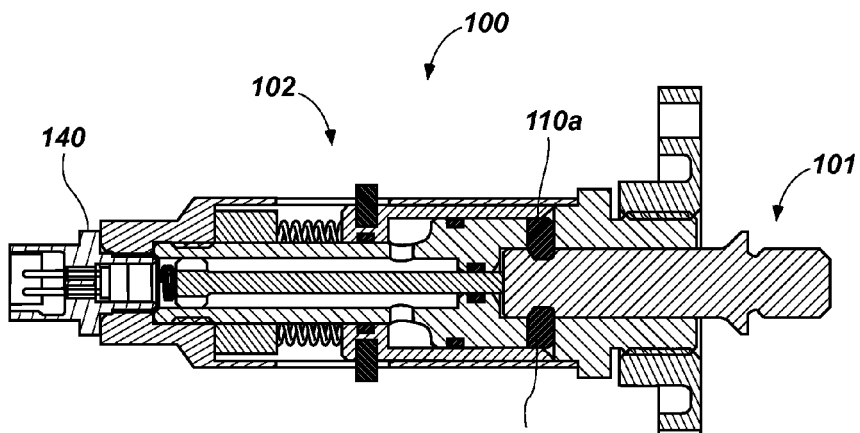
FIG. 3A is a cut-away view of the retention, release, and separation system of FIG. 1A in a retained configuration.
Figure 3B:
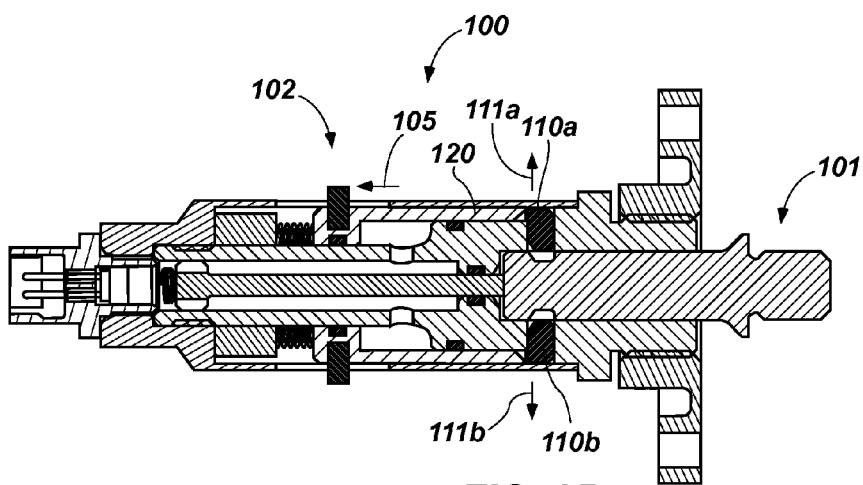
FIG. 3B is a cut-away view of the retention, release, and separation system of FIG. 1A in a released configuration.
Figure 3C:
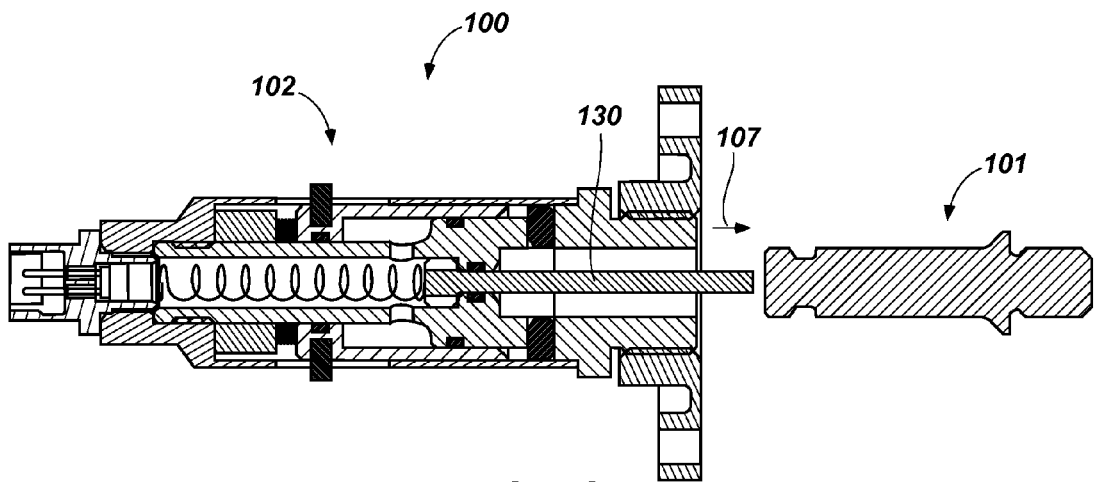
FIG. 3C is a cut-away view of the retention, release, and separation system of FIG. 1A in a separated configuration.

Referring to FIGS. 3A-3C, illustrated are various steps or stages of operation of the system 100. FIG. 3A shows the system 100 in a retained configuration, as discussed herein, with the clips 110*a*, 110*b* of the device 102 retaining the first component 101, with the first component 101 being secured to a first object, and the device 102 being secured to a second object. Upon activation of the fluid source 140 to provide a fluid pressure, the capturing sleeve 120 can be caused to displace in direction 105 in response to the pressure, as shown in FIG. 3B. Upon sufficient displacement of the capturing sleeve 120, the clips 110*a*, 110*b* can move or displace in directions 111*a*, 111*b*, respectively, to release the first component 101. With the first component 101 released, the fluid pressure can cause the separation piston 130 to move in direction 107 and exert a separation force on the first component 101, as shown in FIG. 3C, thereby releasing the first component and the first object from the device (and the second object).

In accordance with one embodiment of the present invention, a method for facilitating retention, release and separation of a first component from a second component is disclosed. The method can comprise facilitating retention of a first component to a second component, wherein a clip of the second component secures the first component, the clip being secured by a capturing sleeve to prevent release of the first component. The method can further comprise facilitating release of the first component, wherein a fluid source provides a fluid pressure sufficient to displace the capturing sleeve, which facilitates displacement of the clip to release the first component. Additionally, the method can comprise facilitating separation of the first component from the second component, wherein the fluid source provides a fluid pressure sufficient to displace a separation piston and generate a separation force provided by the separation piston to the first component to actively separate the first component from the second component upon release of the first component.

In one aspect, the method can comprise facilitating coupling of a first object to the first component. In a specific aspect, the first object can comprise a payload. In another aspect, the method can comprise facilitating coupling of a second object to the second component. In a specific aspect, the second object can comprise a missile.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A retention, release, and separation device, comprising:
   a clip to secure a component;
   a capturing sleeve to secure the clip and prevent release of the component, and to alternately facilitate displacement of the clip to release the component;
   a separation piston that provides a separation force to the component to actively separate the component from the device upon release of the component; and
   a fluid source to provide a fluid pressure sufficient to displace the capturing sleeve and the separation piston, and to generate the separation force,
   wherein the capturing sleeve is slidably disposed about an exterior of a housing to alternately secure and release the clip.

2. The device of claim 1, wherein the clip is slidably supported by the housing to alternately secure and release the component.

3. The device of claim 1, wherein the separation piston is slidably disposed in an interior of the housing.

4. The device of claim 1, wherein the fluid source is fluidly coupled to an interior of the housing and the housing includes a port fluidly coupling the interior and the exterior of the housing, wherein sufficient fluid pressure received through the port causes the capturing sleeve to displace.

5. The device of claim 1, wherein the housing comprises a portion to support and guide movement of the clip.

6. The device of claim 1, wherein the housing comprises a guide configured to guide movement of the separation piston.

7. The device of claim 1, wherein the housing comprises a guide configured to guide movement of the component during separation from the device.

8. The device of claim 1, wherein the clip is biased in a direction to release the component.

9. The device of claim 1, wherein the capturing sleeve is biased in a direction to secure the clip.

10. The device of claim 1, wherein the separation piston is biased in a direction to maintain contact between an end of the separation piston and the component when the component is secured.

11. The device of claim 1, wherein the fluid source comprises a pyrotechnic charge operable to generate a gas.

12. The device of claim 1, further comprising a second clip to secure the component and alternately to release the component, the first clip and the second clip being configured to interface opposing sides of the component and move in opposite directions to release the component.

\* \* \* \* \*